(12) United States Patent
Dolgopolsky et al.

(10) Patent No.: US 6,777,457 B2
(45) Date of Patent: *Aug. 17, 2004

(54) ISOCYANATE-BASED POLYMER FOAM AND PROCESS FOR PRODUCTION THEREOF

(75) Inventors: Inna Dolgopolsky, Richmond Hill (CA); John A. Duley, King City (CA)

(73) Assignee: Woodbridge Foam Corporation (CA)

( * ) Notice: Subject to any disclaimer, the term of this patent is extended or adjusted under 35 U.S.C. 154(b) by 0 days.

This patent is subject to a terminal disclaimer.

(21) Appl. No.: 10/331,363

(22) Filed: Dec. 30, 2002

(65) Prior Publication Data

US 2003/0134922 A1 Jul. 17, 2003

Related U.S. Application Data

(63) Continuation of application No. 09/848,345, filed on May 4, 2001, now abandoned, which is a continuation of application No. 09/209,827, filed on Dec. 11, 1998, now Pat. No. 6,265,457.

(51) Int. Cl.$^7$ ................................................ C08G 18/10
(52) U.S. Cl. ..................... 521/170; 521/134; 521/137; 521/155; 521/174
(58) Field of Search .................................. 521/134, 137, 521/155, 170, 174

(56) References Cited

U.S. PATENT DOCUMENTS

3,694,385 A * 9/1972 Salyer et al. ............... 521/127
6,265,457 B1 * 7/2001 Dolgopolsky et al. ...... 521/155

FOREIGN PATENT DOCUMENTS

WO    WO 90/03997    4/1990

* cited by examiner

Primary Examiner—John M. Cooney, Jr.
(74) Attorney, Agent, or Firm—Katten Muchin; Zavis Rosenman

(57) ABSTRACT

An isocyanate-based polymer foam comprising an isocyanate-based polymer foam matrix having disposed therein a particulate material having an enthalpy of endothermic phase transition of at least about 50 J/g. A process for producing the foam is also described. During the process, the particulate material acts as a heat sink and will undergo an endothermic phase change by absorbing a significant portion of the heat of reaction liberated during the process. This improves the safety of the process by lowering the maximum exotherm experienced by the foam and/or improves product properties.

27 Claims, 9 Drawing Sheets

ISOCYANATE-BASED POLYMER FOAM AND PROCESS FOR PRODUCTION THEREOF

This application is a continuation of Appln. Ser. No. 09/848,345 filed May 4, 2001, now abandoned, which is in turn continuation of Appln. Ser. No. 09/209,827, now U.S. Pat. No. 6,265,457.

BACKGROUND OF THE INVENTION

1. Field of the Invention

The present invention relates to an isocyanate-based polymer foam and to a process for production thereof More particularly, the present invention relates to a novel manner of mitigating the exotherm experienced by an isocyanate-based polymer foam during production.

2. Description of the Prior Art

Isocyanate-based polymers are known in the art. Generally, those of skill in the art understand isocyanate-based polymers to be polyurethanes, polyureas, polyisocyanurates and mixtures thereof.

It is also known in the art to produce foamed isocyanate-based polymers. Indeed, one of the advantages of isocyanate-based polymers compared to other polymer systems is that polymerization and foaming can occur in situ. This results in the ability to mold the polymer while it is forming and expanding.

Generally, an isocyanate-based polymer foam may be produced by reaction a mixture comprising an isocyanate, an active hydrogen-containing compound (i.e., a polyol in the case of polyurethane, a polyamine in the case of polyurea, etc.), a blowing agent, a catalyst and one or more other optional ingredients (e.g., fillers, surfactants, chain extending agents, cell openers, and the like).

One of the conventional ways to produce a polyurethane foam is known as the "one-shot" technique. In this technique, the isocyanate, a suitable polyol, a catalyst, water (which acts as a reactive "blowing" agent and can optionally be supplemented with one or more auxiliary blowing agents) and other additives are mixed together at once using, for example, impingement mixing (e.g., high pressure). Generally, if one were to produce a polyurea, the polyol would be replaced with a suitable polyamine. A polyisocyanurate may result from cyclotrimerization of the isocyanate component. Urethane-modified polyureas or polyisocyanurates are known in the art. In either scenario, the reactants would be intimately mixed very quickly using a suitable mixing technique.

Another technique for producing foamed isocyanate-based polymers is known as the "prepolymer" technique. In this technique, a prepolymer is produced by reacting polyol and isocyanate (in the case of a polyurethane) in an inert atmosphere to form a liquid polymer terminated with reactive groups (e.g., isocyanates). To produce the foamed polymer, the prepolymer is thoroughly mixed with a lower molecular weight polyol (in the case of producing a polyurethane) or a polyamine (in the case of producing a modified polyurea) in the presence of a curing agent and other additives, as needed.

The two major categories of isocyanate-based polymer foams are molded foams and slabstock foams. Generally, molded foams are produced by dispensing a foamable composition into a mold cavity, closing the mold to define a cavity having the desired shape of the article being produced and allowing the foamable composition to polymerize and expand thereby filling the mold cavity.

Generally, slabstock foams are produced as large buns using a continuous or semi-continuous process. These processes usually involve dispensing the foamable composition into a trough having a open top, side walls and a moving bottom conveyer which serves to translate the foaming mass away from the dispensing point. The product here is typically a foam bun. The bun can be 100 feet long with a cross-sectional face of up to 7 feet by 4 feet.

Not surprisingly, when producing slabstock foam, the exotherm of the foam is a significant safety concern. As is known in the art, the reaction between isocyanate and polyol (i.e., when producing a polyurethane foam) is exothermic liberating a significantly large amount of heat. While the exotherm in a molded foam is manageable because the size of the volume product is relatively small, the exotherm in slabstock foam must be specifically addressed since the product is so large. As used throughout this specification, the term "exotherm", when used in the context of an isocyanate-based polymer foam, is intended to mean heat of reaction experienced by the foam during production. Thus, the term, "maximum exotherm" is intended to the mean the maximum heat of reaction experienced by the foam during production—practically, this may be assessed by measuring the maximum temperature reached the foam (typically in the area of the core) directly after production. In practice, once a threshold temperature is reached (typically 165° C.–175° C. for most open cell slabstock foams and up to 200° C. for most rigid, semi-rigid and low airflow slabstock foams), in the presence of air or oxygen, auto-oxidation of the foam may occur resulting in discoloration (product deterioration) and sometimes fire (damaging and/or destroying the manufacturing facility).

The prior art as attempted to address this exotherm problem in slabstock foams using a number of approaches.

One approach relates to replacement of water as an indirect blowing agent with liquid organic blowing agents having a higher heat capacity—i.e., the liquid organic blowing agent would absorb at least a portion of the liberated heat of reaction. Examples of liquid hydrocarbon blowing agents useful for this purpose include: chlorofluorocarbons (e.g., Freon-11, Freon-12, etc.), chlorofluorohydrocarbons (e.g., Freon-142b, Freon-22, etc.), methylene chloride, acetone, 1,1,1-trichloroethane and the like. One problem with this approach is environmental. Specifically, in the mid-1980's, various government agencies began to scrutinize the use of organic carbon-based compounds such as hydrocarbon-based and halocarbon-based blowing agents in light of studies which revealed the potential damage caused by escape of such compounds to and interaction with the ozone layer surrounding the Earth. As a result, the governments of many countries in the world have instituted legislation which significantly curtails or even prohibits the use of organic carbon-based blowing agents such as hydrocarbon-based and halocarbon-based blowing agents.

Another approach involves the use of liquid carbon dioxide to replace the carbon dioxide produced in-situ during the reaction between the isocyanate and water. A disadvantage of this approach is that it necessitates significantly high capital cost in the manufacturing facility and there are processing problems (e.g., "pin-holes" in the product and/or poor flow characteristics before rise) with the product.

Yet another approach involves trying to rapidly cool a fresh, "hot" bun of foam by drawing cold or ambient air through the bun. A disadvantage of this approach is that the properties of the foam must be tightly controlled to ensure that it has a high open cell content to allowing the airflow to pass through the foam.

Yet another approach involves the use a reduced atmospheric pressure to produced low density foam without an excessive amount of water. A disadvantage of this approach is that it necessitates significantly high capital cost in the manufacturing facility and the use of relatively expensive copolymer polyols to achieve the firmness of the foam which would ordinarily be lost by reducing the amount of water in the foam formulation.

Thus, despite these various prior art approaches there remains a need in the art for a reliable way of reducing the exotherm inherent in the production of isocyanate-based foams, particularly slabstock polyurethane foams. It would be even more advantageous if the exotherm inherent in the production of the isocyanate-based foam could be reduced without the necessitating an increase in the capital cost of the manufacturing facility and/or the use of relatively expensive chemicals in the foam formulation.

SUMMARY OF THE INVENTION

It is an object of the invention to obviate or mitigate at least one of the above-disadvantages of the prior art.

It is another object of the invention to provide a novel isocyanate-based polymer foam.

It is yet another object of the present invention to provide a novel process for producing an isocyanate-based polymer foam.

Accordingly, in one of its aspects, the present invention provides an isocyanate-based polymer foam comprising an isocyanate-based polymer foam matrix having disposed therein a particulate material having an enthalpy of endothermic phase transition of at least about 50 J/g.

Accordingly, in one of its aspects, the present invention provides an isocyanate-based polymer foam comprising an isocyanate-based polymer foam matrix having disposed therein a crystalline particulate material.

In another of its aspects, the present invention provides a process for producing of an isocyanate-based polymer foam, the process comprising the steps of:
  contacting an isocyanate, an active-hydrogen containing compound, water, a catalyst and a particulate material having an enthalpy of endothermic phase transition of at least about 50 J/g to produce a reaction mixture;
  expanding the reaction mixture to produce the isocyanate-based polymer foam.

In yet another of its aspects, the present invention provides a process for producing an isocyanate-based polymer foam, the process comprising the steps of:
  contacting an isocyanate, an active-hydrogen containing compound, water, a catalyst and a crystalline particulate material to produce a reaction mixture;
  expanding the reaction mixture to produce the isocyanate-based polymer foam.

In yet another of its aspects, the present invention provides a process for producing an isocyanate-based polymer foam, the process comprising the steps of:
  contacting an isocyanate, an active-hydrogen containing compound, water, a catalyst and a particulate material to produce a reaction mixture;
  expanding the reaction mixture to produce the isocyanate-based polymer foam;
  wherein the particulate material is selected such that the temperature of the reaction mixture during expansion is lower than the temperature of a reaction omitting the particulate material.

Throughout this specification, the terms "enthalpy of melting", "latent heat of melting" and "heat of fusion" are intended to have the same meaning and are used interchangeably, and area encompassed by the enthalpy of endothermic phase transition of the material.

Thus, the present inventors have discovered a novel approach to the production of isocyanate-based foams in which the maximum exotherm experienced by the foam during production is reduced thereby improving product properties and, importantly, improving plant safety by mitigating the occurrence of auto-oxidation of the foam. Generally, the discovery relates to the addition to the foam formulation of an additive material which is capable of undergoing a transition involving an endothermic phase change. Typically, the material will be a solid at ambient temperature and pressure. While not wishing to be bound by any particular theory or mode of action, it is believed that, in most cases, the endothermic phase change will occur by the solid absorbing at least a significant portion of the heat of reaction liberated during production of the isocyanate-based polymer foam resulting in melting and/or endothermic transition (e.g., sublimation) of the solid material. As the foam cools the additive material may solidify. Thus, while it is believed that the total heat of reaction in production of the foam remains substantially unchanged, the additive material is believed to act as an active heat sink (i.e., the material is active in the sense that it undergoes some form of phase transition before the maximum exotherm of the foam) which quickly absorbs a portion of the heat of reaction and subsequently liberates the absorbed heat of reaction over a relatively long period of time. The net result of this a lowering of the maximum exotherm (or temperature) experienced by the foam during production and possibly, as side benefit, more uniform and/or improved properties (e.g., decreased humid-aged compression set) due to a reduction in the temperature gradient experienced by the foam.

BRIEF DESCRIPTION OF THE DRAWINGS

Embodiments of the present invention will be described with reference to the accompanying drawings, in which.

DETAILED DESCRIPTION OF THE PREFERRED EMBODIMENTS

Figure 1:
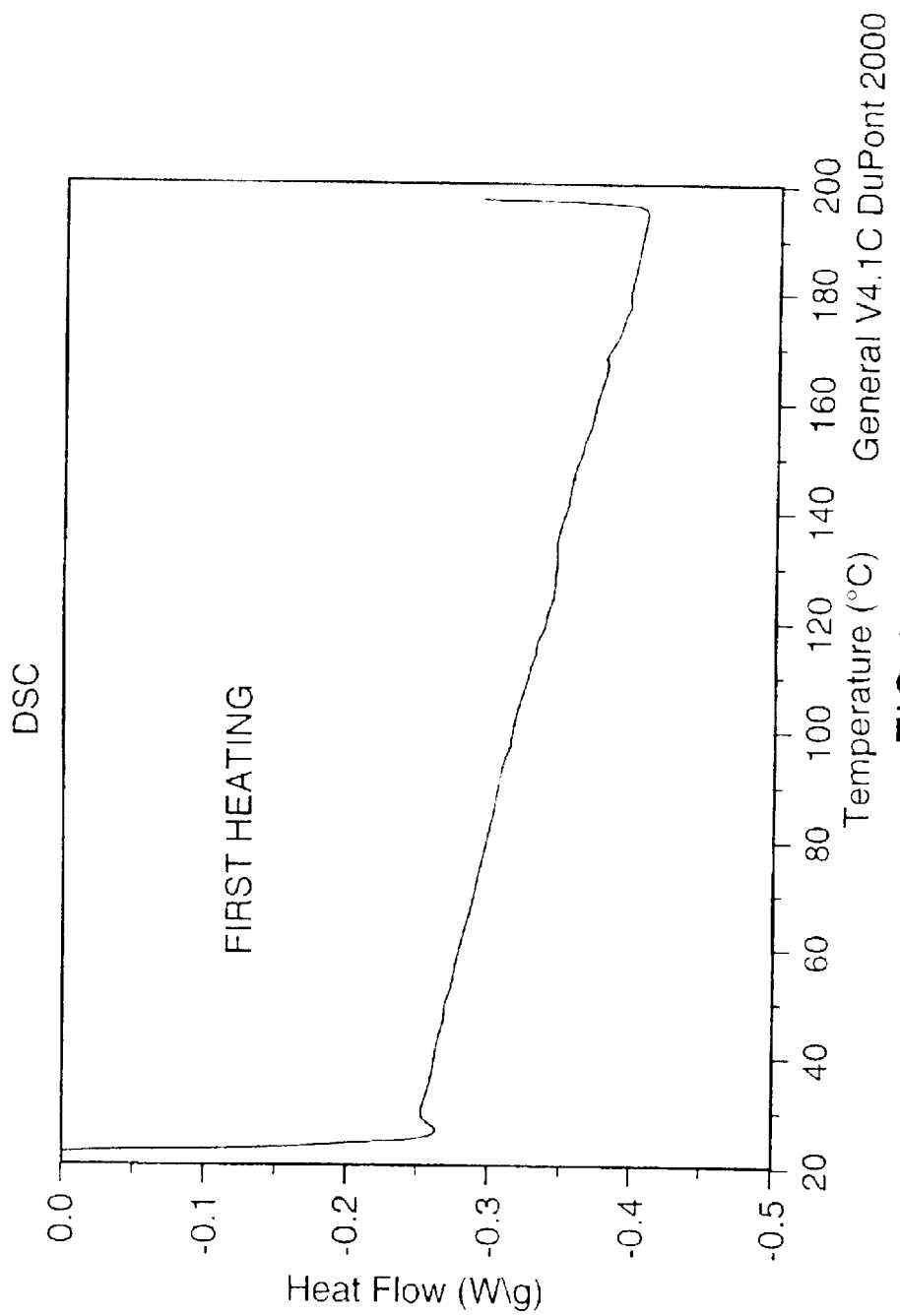
FIGS. 1–6 illustrate the results of Differential Scanning Calorimetry (DSC), pursuant to ASTM E793-85, conducted in respect of various particulate materials.

The present invention is related to, inter alia, a isocyanate-based polymer foam comprising a particulate material and to a process for production thereof.

Generally, the present isocyanate-based polymer foam is selected from the group comprising polyurethane foam, polyurea foam, polyisocyanurate foam, urea-modified polyurethane foam, urethane-modified polyurea foam, urethane-modified polyisocyanurate foam and urea-modified polyisocyanurate foam. The preferred foamed isocyanate-based polymer is selected from the group consisting of polyurethane foam and urea-modified polyurethane foam. The most preferred isocyanate-based polymer is polyurethane foam. As is known in the art, the term "modified", when used in conjunction with a polyurethane, polyurea or polyisocyanurate means that up to 50% of the polymer backbone forming linkages have been substituted.

In one preferred embodiment, the particulate material has an enthalpy of endothermic phase transition of at least about 50 J/g. Preferably the particulate material has an enthalpy of endothermic phase transition in the range of about 50 to about 600 J/g, more preferably. from about 75 to about 400 J/g, most preferably from about 100 to about 250 J/g. For a given particulate material, the enthalpy of endothermic phase transition can be readily determined by a person of ordinary skill in the art. Specifically, the test method for Heats of Fusion and Crystallization may be determined by Differential Scanning Calorimetry (DSC)), pursuant to ASTM E793-85.

The particulate material should be chosen such that it can undergo a transition involving an endothermic phase change (i.e., a phase change as a result of absorbing heat) at a temperature below the maximum exotherm which the foam would experience during production in the absence of the particulate material. The maximum exotherm may be determined as follows:

1. The foamable composition (typically comprising an isocyanate, an active-hydrogen containing compound, water, a catalyst and a particulate material) is poured into a container.
2. Immediately after the foam has reached the fill rise, a thermocouple probe is inserted into the geometric centre of the bun. When the thermocouple reaches the centre of the bun is considered as time zero and the first reading is taken.
3. Temperature readings are taken every minute, while temperature was rising, and every 15 minutes after the maximum was reached until a decrease of 20° C. is reached.

A flexible thermocouple probe of diameter 1–2 mm is preferred. The length of the probe should be sufficient to reach the centre of the bun. Actual measurements can be done by using, for example, thermocouple AFDO/240GK03H with a Gordon sensor 0.063" diameter and 24" long sheath from Zesta Engineering Ltd. A type K thermocouple digital thermometer from Bamat Company can be used for the temperature readings.

Preferably, the particulate material is a solid at ambient temperature and pressure (e.g., 20° C. and 1 atmosphere, respectively). Ideally, the physical transition occurs as a result of the particulate material absorbing at least a portion of the heat of reaction from the reaction mixture thereby resulting in at least one of melting, dehydration, sublimation and solid/solid transition, preferably melting, of the particulate material.

The particulate material may be crystalline or non-crystalline. Highly crystalline polymers and/or partially crystalline (semi-crystalline) polymers are specifically preferred for use as the particulate materials.

The size of the particulate material is not specifically restricted provided that it does not have a deleterious effect on processing of the (e.g., the size of the particulate material should not result in such an increase in viscosity of the resin that it becomes difficult to meter or otherwise handle). Preferably, the particulate material has an average particle size of less than about 1000 μm, more preferably in the range of from about 1 to about 500 μm, most preferably in the range of from about 10 to about 200 μm.

The amount of particulate material contain is in the present isocyanate-based polymer foam is preferably less than about 20% by weight of the foam, more preferably from about 0.5% to about 15% by weight of the foam, most preferably from about 5% to about 10% by weight of the foam. The amount of particulate material used can be influenced by a number of factors, including the heat capacity of the specific particulate material being used, the maximum exotherm of the foam being produced with the particulate material and the viscosity of the reaction, especially at higher loadings of particulate material.

As described above, the preferred particulate material is crystalline in nature. In this regard, it should be appreciated that the term "crystalline", when used in this specification in reference to the particulate material, is intended to have a broad meaning and covers partially crystalline (i.e., semi-crystalline) and high crystalline solids. Such particulate materials are especially useful to produce molded foam or a slabstock foam. However, as will be plainly apparent to a person skilled in the art, the present process may be used advantageously to lower the maximum exotherm of a slabstock foam during production. While not wishing to be bound by any particular theory or mode of action, it is believed that at least some of the advantages accruing from the present invention relate to the heat absorption capability of the crystalline particulate material. Specifically, in this preferred embodiment, the crystalline a particulate material is used which has a melting below the maximum temperature reached by the foam during production (this may be determined as discussed above). Thus, as heat is liberated during the reaction, a portion thereof, instead of raising the exotherm the foam, is absorbed by the crystalline particulate material, typically resulting in melting of the particulate material. Since the crystalline particulate material is substantially uniformly distributed throughout the foam matrix, the result is an overall lowering of the maximum exotherm experienced by the foam. This dramatically improves the safety of foam production and/or obviates deterioration of production properties. As the foam matrix cools after production, the particulate material re-crystallizes or re-solidifies.

In one preferred embodiment, the particulate material is organic, preferably an organic polymer, more preferably a thermoplastic material. Non-limiting examples of useful thermoplastic polymers may be selected from the group comprising: polyethylene, polypropylene, chlorinated polyethylene, ethylene-vinyl-acetate (EVA) polyethylethacrylate (PEEA), acetal, nylon 11, polyvinylidenechloride, polybutene, epichlorohydrin(ECO) plastic rubber-modified analogues copolymers and mixtures thereof. More preferably, the particulate material is selected from the group comprising polyethylene, polypropylene and mixtures thereof. Most preferably, the particulate material is crystalline polyethylene. Non-limiting examples of other useful organic materials may be selected from the group comprising paraffins, fatty acids, alcohols, tetradecanoic acid mysistamide, salts of fatty acids (e.g., calcium stearate (melting point 180° C.), zinc stearate (melting point 130° C.), zinc laurate (melting point 130° C.) and the like).

Alternatively, the particulate material may be inorganic. Non-limiting examples of other useful organic materials may be selected from the group comprising sodium thiosulfate pentahydrate (melting point 75° C.), sodium acetate trihydrate (melting point 58° C.), sodium sulfate decahydrate (melting point 32° C.), sodium carbonate (dehydration point 100° C.), barium hydroxide (melting point 78° C.), calcium chloride (dehydration point 100° C.), nickel nitrate tetrahydrate (melting point 40° C.), zinc nitrate hexahydrate (melting point 36.4–45.5° C.), blends thereof, alloys thereof and eutectic mixtures thereof.

Of course, those of skill in the art will recognize that modified particulate materials may also be used. For example, it is known to surface modify particles by exposing them to ultraviolet, electrobeam and similar treatments to, for example, improve adhesion of the particles in the matrix in which there are being dispersed.

A preferred process for producing the present isocyanate-based polymer foam comprises the steps of:
  contacting an isocyanate, an active-hydrogen containing compound, water, a catalyst and a particulate material to produce a reaction mixture;
  expanding the reaction mixture to produce the isocyanate-based polymer foam.

The first step in the present process comprises provision of a reaction mixture comprising an active hydrogen-containing compound, an isocyanate, an aqueous blowing agent and a catalyst.

Preferably, the active hydrogen-containing compound is selected from the group comprising non-hydrophilicpolyols, polyamines, polyamides, polyimines, polyolamines and mixtures thereof.

Thus, if the process is utilized to produce a polyurethane foam, the active hydrogen-containing compound is typically a polyol. Generally, the choice of such a polyol is not particularly restricted and is within the purview of a person skilled in the art. For example, the polyol may be a hydroxyl-terminated compound selected from the group comprising polyether, polyester, polycarbonate, polydiene and polycaprolactone. The polyol may be selected from the group comprising hydroxyl-terminated polyhydrocarbons, hydroxyl-terminated polyformals, fatty acid triglycerides, hydroxyl-terminated polyesters, hydroxymethyl-terminated polyesters, hydroxymethyl-terminated perfluoromethylenes, polyalkylene ether glycols, polyalkylenearyleneether glycols and polyalkyleneether triols. The polyol may also be selected from the group comprising adipic acid-ethylene glycol polyester, poly(butylene glycol), poly(propylene glycol) and hydroxyl-terminated polybutadiene—see, for example, British patent No. 1,482,213, the contents of which are incorporated herein by reference. Blends of one or more of such polyols are also possible. Preferably, such a polyol has a molecular weight in the range of from about 200 to about 20,000, most preferably from about 300 to about 6,000.

Further, it is possible to utilize a prepolymer technique to produce a polyurethane foam within the scope of the present invention. In one embodiment, it is contemplated that the prepolymer be prepared by reacting an excess of isocyanate with a polyol (as discussed above). The prepolymer could then be reacted with further polyol (the same or different than the first polyol) to produce a polyurethane foam or an amine to produce a polyurea-modified polyurethane.

If the process is utilized to produce a polyurea-modified polyurethane foam, the hydrogen-containing compound comprises, at least in part, compounds wherein hydrogen is bonded to nitrogen. Preferably such compounds are selected from the group comprising polyamines, polyamides, polyimines and polyolamines, more preferably polyamines. Non-limiting examples of such compounds include primary and secondary amine terminated polyethers. Preferably such polyethers have a molecular weight of greater than about 1500, a functionality of from 2 to 6, and an amine equivalent weight of from about 200 to about 6,000. Such amine terminated polyethers are typically made from an appropriate initiator to which a lower alkylene (e.g., ethylene, propylene, butylene and mixtures thereof) oxide is added with the resulting hydroxyl terminated polyol being subsequently aminated. If two or more alkylene oxides are used, they may be present either as random mixtures or as blocks of one or the other polyether. For ease of amination, it is especially preferred that the hydroxyl groups of the polyol be essentially all secondary hydroxyl groups. Typically, the amination step replaces the majority but not all of the hydroxyl groups of the polyol.

In another embodiment, the first polyol may comprise a polymer polyol, also known as graft copolymer polyols. As is known in the art, such polyols are generally polyether polyol dispersions which are filled with other organic polymers. Such polymer polyols are useful in load building or improving the hardness of the foam when compared to using unmodified polyols. Non-limiting examples of useful polymer polyols include: chain-growth copolymerpolyols (e.g., containing particulate poly(acrylonitrile),poly(styrene-acrylonitrile) and mixtures thereof), and/or step-growth copolymer polyols (e.g., PolyHarnstoff Dispersions (PHD), polyisocyanate polyaddition (PIPA) polyols, epoxy dispersion polyols and mixtures thereof). For further information on polymer polyols, see, for example, Chapter 2 of FLEXIBLE FOAM FUNDAMENTALS, Herrington et al. (1991) and the references cited therein, the contents of which are incorporated herein by reference. If a polymer polyol is used, it may be present alone or in admixture with an unmodified polyol. Generally, mixtures may be used which contain polymer polyol in an amount in the range of from about 5 to about 100 percent by weight of unmodified polyol present in the mixture.

As used throughout this specification, the term "equivalent weight" means mass of active hydrogen-containing compound per reactive hydrogen pursuant to the following formula:

$$\text{Equivalent Weight} = M.W./f$$

wherein M.W. is the molecular weight of the compound and f is the number of reactive hydrogens (i.e. functionality) in a molecule of the compound. Thus, one equivalent weight of active hydrogen-containing compound will react stoichiometrically with one equivalent weight of isocyanate.

Since determining the functionality of the polyol can be complex, an alternative and practical way to determine the equivalent weight of a polyol is pursuant to the following equation:

$$\text{Equivalent Weight} = (56.1 \times 1000)/\text{OH Number}$$

wherein OH Number is the hydroxyl number of the polyol. As is known in the art, hydroxyl number can be measured and provides an indication of the number of hydroxyl groups in the polyol which are available for reaction. As is further known in the art, there are various conventional analytical methods for determining the hydroxyl number of a polyol—see, for example, Chapter 2 of FLEXIBLE FOAM FUNDAMENTALS, Herrington et al. (1991) and the references cited therein, the contents of which are incorporated herein by reference.

These analytical methods include wet analytical and infrared spectroscopic techniques.

The reaction mixture in the first step of the present process further comprises an isocyanate. Of course, those of skill in the art will recognize that a mixture of two or more isocyanates may be used. The choice of isocyanate suitable for use in the reaction mixture is generally within the purview of a person skilled in the art. Generally, the isocyanate compound suitable for use may be represented by the general formula:

$$Q(NCO)_i$$

wherein i is an integer of two or more and Q is an organic radical having the valence of i. Q may be a substituted or unsubstituted hydrocarbon group (e.g. an alkylene or arylene group). Moreover, Q may be represented by the general formula:

$Q^1$-Z-$Q^1$ wherein $Q^1$ is an alkylene or arylene group and Z is chosen from the group comprising —O—, —O-$Q^1$-, —CO—, —S—, —S-$Q^1$-S— and —$SO_2$—. Examples of isocyanate compounds which fall within the scope of this definition include hexamethylene diisocyanate, 1,8-diisocyanato-p-methane, xylyl diisocyanate, $(OCNCH_2CH_2CH_2OCH_2O)_2$, 1-methyl-2,4-diisocyanatocyclohexane, phenylene diisocyanates, toluene diisocyanates, chlorophenylene diisocyanates, diphenylmethane-4,4'-diisocyanate, naphthalene-1,5-diisocyanate,triphenylmethane-4,4',4"-triisocyanate and isopropylbenzene-alpha-4-diisocyanate.

In a preferred embodiment, Q may also represent a polyurethane radical having a valence of i. In this case $Q(NCO)_i$ is a compound which is commonly referred to in the art as a prepolymer. Generally, a prepolymer may be prepared by reacting a stoichiometric excess of an isocyanate compound (as discussed hereinabove) with a polyhydroxyl-containing material or polyol (as discussed hereinabove). In this embodiment, the isocyanate may be, for example, used in proportions of from about 30 percent to about 200 percent stoichiometric excess with respect to the proportion of hydroxyl in the polyol. The prepolymer may then be reacted with a polyol to produce a polyurethane foam or an amine to produce a polyurea-modified polyurethane. As will be demonstrated below, if the polyol used to produce the prepolymer is the chain extending agent (as discussed hereinbelow), it is still necessary to utilize the second polyol in the polyol mixture. Further, the second polyol in the polyol mixture described above should be used in the polyol mixture regardless of whether a similar polyol is used to produce the prepolymer to ensure that a polyurethane foam having an integral skin is produced. Thus, in the context of the present process, a prepolymer should be considered a subset of useful isocyanates and the use thereof does not replace the need to use the polyol mixture discussed hereinabove. A non-limiting example of a prepolymer useful in the present process is commercially available from Bayer Corporation under the tradename Mondur™ PF.

In another embodiment, the isocyanate compound suitable for use in the process of the present invention may be selected from dimers and trimers of isocyanates and diisocyanates, and from polymeric diisocyanates having the general formula:

$[Q''(NCO)_i]_j$ wherein both i and j are integers having a value of 2 or more, and Q" is a polyfunctional organic radical, and/or, as additional components in the reaction mixture, compounds having the general formula:

$L(NCO)_i$ wherein i is an integer having a value of 1 or more and L is a monofunctional or polyfunctional atom or radical. Examples of isocyanate compounds which fall with the scope of this definition include ethylphosphonic diisocyanate, phenylphosphonic diisocyanate, compounds which contain a =Si—NCO group, isocyanate compounds derived from sulfonamides ($QSO_2NCO$), cyanic acid and thiocyanic acid.

See also for example, British patent No. 1,453,258, the contents of which are incorporated herein by reference.

Non-limiting examples of suitable isocyanates include: 1,6-hexamethylene diisocyanate, 1,4-butylenediisocyanate, furfurylidenediisocyanate, 2,4-toluene diisocyanate, 2,6-toluene diisocyanate, 2,4'-diphenylmethane diisocyanate, 4,4'-diphenylmethane diisocyanate, 4,4'-diphenylpropane diisocyanate, 4,4'-diphenyl-3,3'-dimethyl methane diisocyanate, 1,5-naphthalenediisocyanate, 1-methyl-2,4-diisocyanate-5-chlorobenzene2,4-diisocyanato-s-triazine, 1-methyl-2,4-diisocyanato cyclohexane, p-phenylene diisocyanate, m-phenylenediisocyanate, 1,4-naphthalene diisocyanate, dianisidine diisocyanate,bitoluene diisocyanate, 1,4-xylylene diisocyanate, 1,3-xylylene diisocyanate, bis-(4-isocyanatophenyl)methane, bis-(3-methyl-4-isocyanatophenyl)methane, polymethylene polyphenyl polyisocyanates and mixtures thereof.

A preferred isocyanate is selected from the group comprising 2,4'-diphenylmethane diisocyanate, 4,4'-diphenylmethane diisocyanate and mixtures thereof. A preferred isocyanate of this type is a mixture comprising from about 15 to about 25 percent by weight 2,4'-diphenylmethane diisocyanate and from about 75 to about 85 percent by weight 4,4'-diphenylmethane diisocyanate. An example of such an isocyanate is commercially available from Imperial Chemical Industries under the tradename Rubinate M. Another preferred isocyanate of this type is commercially available from BASF Corporation under the tradename Lupranate™ MM-103 (a solvent-free, carbodiimide modified 4,4'-diphenylmethane diisocyanate).

Another preferred isocyanate may be selected from the group comprising 2,4-toluene diisocyanate, 2,6-toluene diisocyanate and mixtures thereof.

Preferably, the isocyanate used in the present process has a functionality in the range of from about 2.0 to about 2.7.

The isocyanate preferably is used in an amount to provide an isocyanate index, inclusive of all reactive equivalents in the reaction mixture, in the range of from about 60 to about 200, more preferably from about 70 to about 140, most preferably from about 90 to about 120.

The reaction mixture used in the first step of the present process further comprises a blowing agent. The preferred blowing agent is aqueous blowing agent. As is known in the art, aqueous blowing agents, such as water, can be used as a reactive blowing agent in the production of isocyanate-based polymer foams. Specifically, water reacts with the isocyanate forming carbon dioxide which acts as the effective blowing agent in the final foamed polymer product. A key advantage of the present process is the ability to produce a slabstock polyurethane foam using an amount of water which, in conventional practice, could results in a very high exotherm in the foam after production.

It is known in the art that the amount of water used as a blowing agent in the preparation of a isocyanate-based polymer foam is conventionally in the range of from about 0.20 to as high as about 8.0 or more parts by weight, most preferably from about 2.5 to about 8.0 parts by weight, per one hundred parts by weight of the active hydrogen-containing compound in the reaction mixture. Since the amount of water used in the production of a foam is limited by the fixed properties expected or desired in the foam, it may be desirable, in certain circumstances, to utilize a substantially inert liquid extender if a highly filled (e.g., pigmented) foam is being produced. Non-limiting examples of suitable liquid extenders include halogenated hydrocarbons, high molecular weight hydrocarbons and polyols.

The reaction mixture used in the first step of the present process further comprises a catalyst. The catalyst promotes reaction of the polyol mixture with the isocyanate. The choice and use of such a catalyst is within the purview of a person skilled in the art. See for example U.S. Pat. Nos. 4,296,213 and 4,518,778, the contents of each of which is incorporated herein by reference. Suitable catalysts include tertiary amines and/or organometallic compounds. Non-limited examples of useful catalysts for use in the present process may be selected from the group consisting of quaternary ammonium salts, triethylenediamine, N-methylmorpholine, N-ethylmorpholine, diethanolamine, N-cocomorpholine, 1-methyl-4-dimethylaminoethylpiperazine, methoxypropyldimethylamine, N,N,N'-trimethylisopropyl propylenediamine, 3,-diethylaminopropyldiethylamine, dimethylbenzylamine, dibutyltin dilaurate, dibutyltin diacetate, stannous chloride, dibutyltin di-2-ethyl hexanoate, stannous octoate and mixtures thereof. See, for example, U.S. Pat. No. 4,590,219 [Nissen et al.], the contents of which are hereby incorporated by reference, for a discussion of various of these and other suitable catalysts. Preferably, the catalyst is used in an amount in the range of from about 0.05 to about 2.5, more preferably from about 0.10 to about 2.0, most preferably from about 0.10 to about 0.60, parts by weight per one hundred parts by weight of the polyol mixture.

As will be clearly understood by those of skill in the art, it is contemplated that conventional additives in the polyurethane foam art can be used in the present process. Non-limiting examples of such additives include: filler materials (e.g., materials which have an enthalpy of endothermic transition less than 50 J/g), surfactants (e.g., organosilicone compounds available under the tradename L-540 Union Carbide), cell openers (e.g., silicone oils), extenders (e.g., halogenated paraffins commercially available as Cereclor S45), cross-linkers (e.g., low molecular weight reactive hydrogen-containing compositions), pigments/dyes, flame retardants (e.g., halogenated organo-phosphoric acid compounds), inhibitors (e.g., weak acids), nucleating agents (e.g., diazo compounds), anti-oxidants, UV stabilizers (e.g., hydroxybenzotriazoles, zinc dibutyl thiocarbamate, 2,6-ditertiary butylcatechol, hydroxybenzophenones, hindered amines and mixtures thereof), plasticizers (e.g., sulfonated aromatic compounds), biocides, antistatic agents (e.g., ionizable metal salts, carboxylic acid salts, phosphate esters and mixtures thereof) and mixtures thereof The amounts of these additives conventionally used is within the purview of a person skilled in the art—see, for example, Chapter 2 of FLEXIBLE FOAM FUNDAMENTALS, Herrington et al. (1991) and the references cited therein, the contents of which are incorporated herein by reference.

The manner by which the polyol mixture, isocyanate, blowing agent, particulate material and catalyst are contacted in the first step of the present process is not particularly restricted. Thus, it is possible to preblend the components in a separate tank which is then connected to a suitable mixing device for mixing with the blowing agent and catalyst. Alternatively, it is possible to preblend the active hydrogen-containing compound with the blowing agent, catalyst and other additives, if present, to form a resin. This resin preblend could then be fed to a suitable mixhead (high pressure or low pressure) which would also receive an independent stream of the isocyanate.

Once the active hydrogen-containing compound, isocyanate, blowing agent, chain extending agent and catalyst have been contacted and, ideally, mixed uniformly, a reaction mixture is formed. This reaction mixture is then expanded to produce the present isocyanate-based polyurethane foam. As will be apparent to those of skill in the art, the process of the present invention is useful in the production of slabstock foam, molded articles and the like.

The manner by which expansion of the reaction mixture is effected will be dictated by the type of foam being produced.

Embodiments of the present invention will now be described with reference to the following Examples which should not be construed as limiting the scope of the invention. The term "pbw" used in the Examples refers to parts by weight.

In the Examples the following compounds were used:
1. Arcol™ LHT-112, a polyether polyol having equivalent weight of 500 (molecular weight of approximately 1500), commercially available from Lyondell Corporation;
2. Arcol™ F-3020, a polyether polyol having equivalent weight of 1000 (molecular weight of approximately 3000), commercially available from Lyondell Corporation;
3. Arcol™ E788, a polyether polyol having about 38% SAN solids, equivalent weight of 2540, commercially available from Lyondell Corporation;
4. Arcol™ PPG-725, a polyether polyol having equivalent weight of 380 (molecular weight of approximately 760), commercially available from Lyondell Corporation;
5. Voranol™ 360, a polyether polyol having equivalent weight of 156 (molecular weight of approximately 700), commercially available from The Dow Chemical Company;
6. Voranol™ 230–660, a polyether polyol having equivalent weight of 85 (molecular weight of approximately 250), commercially available from The Dow Chemical Company;
7. Baynat-755™, a polyether polyol system having equivalent weight of 150–168 and water content of 4.2–4.4 pph, commercially available from Bayer Corporation;
8. PS 2502A, a polyester polyol having an equivalent weight of 224.4, commercially available from Stepan Corporation;
9. Pluracol™ 1178, a polyether polyol having equivalent weight of 2250 (molecular weight of 6500), commercially available from BASF Corporation;
10. Voranol™ V4701, a polyether polyol having an equivalent weight of 1780 (molecular weight approx. 5340), commercially available from The Dow Chemical Company;
11. DEOA-LF, diethanol amine—low freezing grade, having 15% water, an equivalent weight of 24, commercially available from The Dow Chemical Company;
12. Tegostab™ B8871, an organosilicone copolymer cell-opening surfactant commercially available from Goldschmidt Chemical Corporation;
13. Niax™ L5770—alkyl-pendant organosilicone surfactant, commercially available from Osi Specialities, a Witco Company;
14. NiaX™ Y10184, organosilicone surfactant for molded foams, commercially available from Osi Specialities, A Witco Company;
15. Tegostab™ B4690—organosilicone surfactant for moulded foams, commercially available from Goldschmidt Chemical Corporation;
16. Niax™ A1–70% bis(2-dimethylethaminoethyl) ether in dipropylene glycol, commercially available from Osi Specialities, A Witco Company;
17. Niax™ C-255—balanced amine catalyst, commercially available from Osi Specialities, A Witco Company;

18. Polycat™ 12-N, Methyl dicyclodclorohexylamine, commercially available from Air Products and Chemicals Inc.;
19. Dabco™ T12, Dibuthyltin dilaurate, commercially available from Air Products and Chemicals Inc.;
20. Dabco™ 33LV-335, Triethylene diamine in dipropyleneglycol, commercially available from Air Products and Chemicals Inc.;
21. Dabco™ T10, stannous octoate, commercially available from Air Products and Chemicals Inc.;
22. Diethyleneglycol, a chain-extender;
23. Isocyanate A: PAPI™ 27 Polymeric MDI, polymethylene polyphenyl isocyanate, containing 4,4' Methylene bisphenyl isocyanate with total NCO content 31.0–31.5%, commercially available from The Dow Chemical Company;
24. Isocyanate B: Mondur™ MR Polymeric MDI, polymethylene polyphenyl isocyanate, containing 4,4' Methylene bisphenyl isocyanate with total NCO content 31.0–31.5%, commercially available from Bayer Corporation;
25. Isocyanate C: T-80™, toluene diisocyanate, commercially available TDI;
26. Melamine, a particulate material commercially available from Melamine Chemicals Inc.
27. Polyethylene, Escorene™ HD-8761-27 RBG, a particulate material commercially available from Exxon Corporation; and
28. Polypropylene, Montel™ 5M 6100, a particulate material commercially available from Shell.

EXAMPLES 1–12

In these Examples, various foams were produced pursuant to the formulations provided in Table 1. The methodology used in each Example was as follows.

A resin mixture was produced by mixing all ingredients except the isocyanate and the particulate material. This resin mixture and the isocyanate were preconditioned to a temperature of 25° C.

The particulate material was ground, as necessary, such that it had an average particle size of less than 1000 μm. At this point the particulate material was added to the resin mixture and mixed well until a substantially homogenous mixture was achieved. Of course those of skill in the art will recognize that the particulate material could be added to the isocyanate or could divided in some fraction between the resin mixture and the isocyanate.

The homogeneous resin mixture (i.e., containing the particulate material) was mixed in a suitably sized container and the isocyanate was added thereto. After approximately 10 seconds, the reaction mixture in the container was transferred to a 10"×10"×6" cardboard box and was allowed to expand to form a free-rise foam bun. A thermocouple attached to a recorder was inserted into the middle of the foam bun once the free-rise foam bun had finished expanding (visually) and the temperature was recorded used the overall procedure described above.

Figure 2:
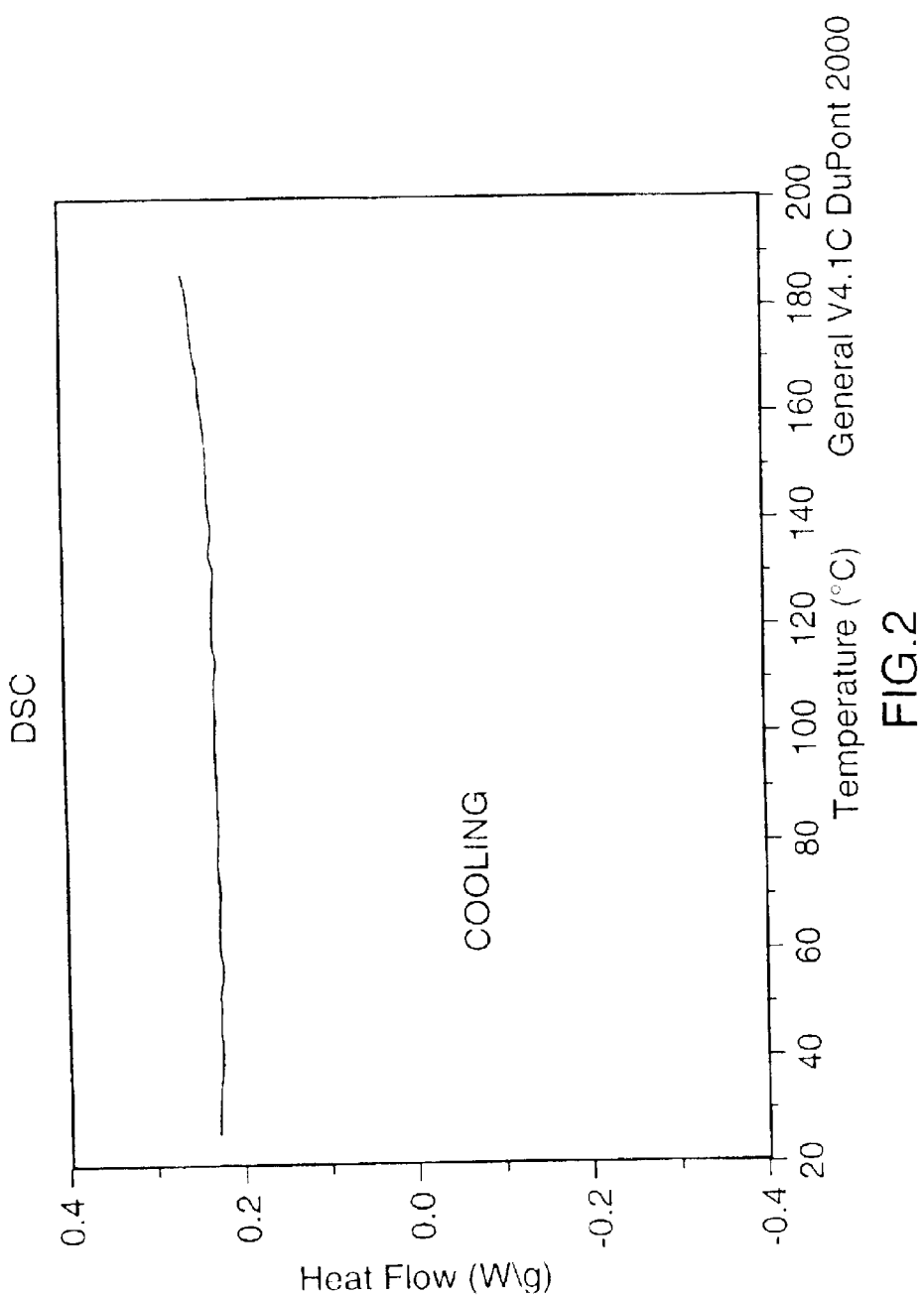
Figure 3:
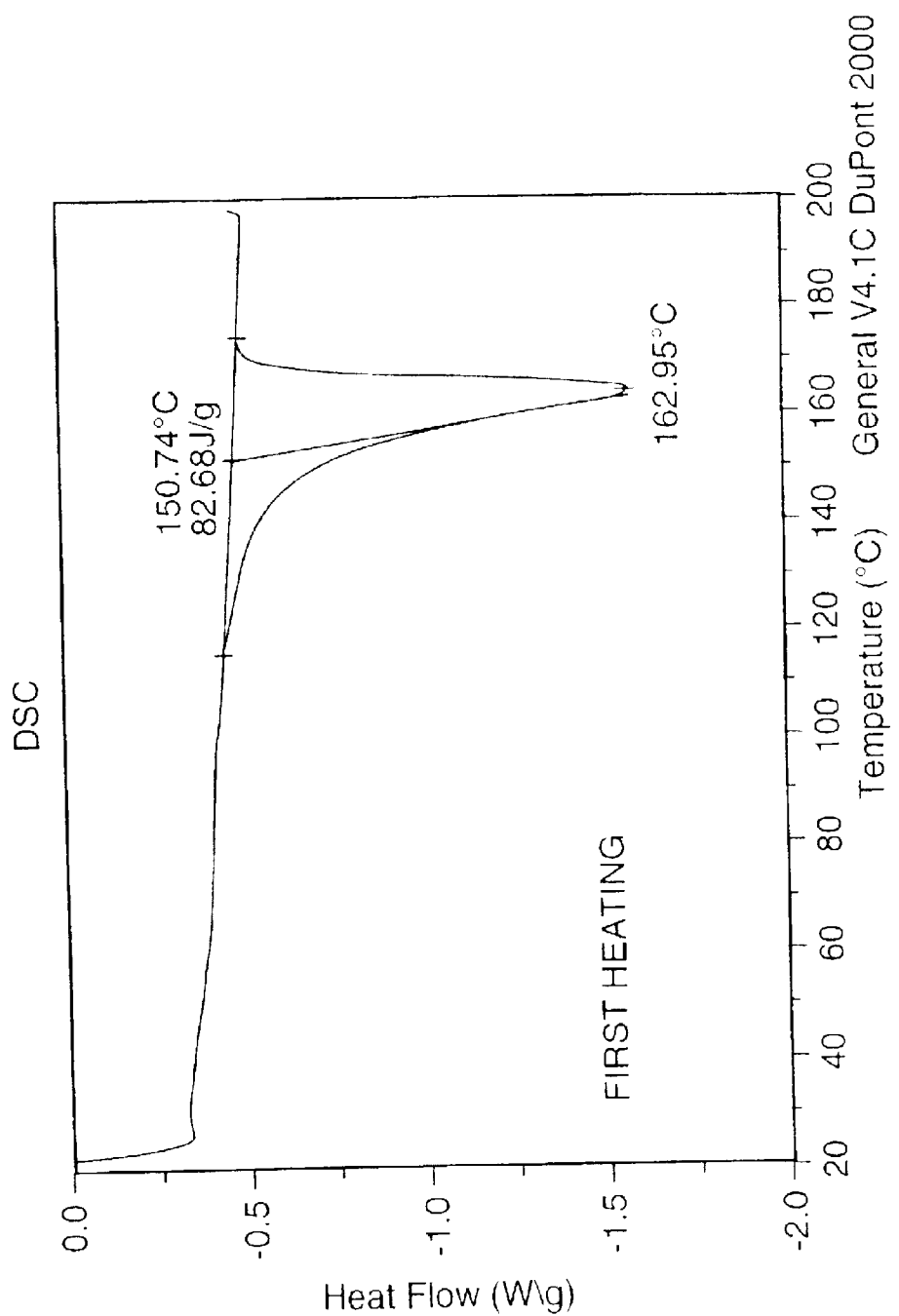
Figure 4:
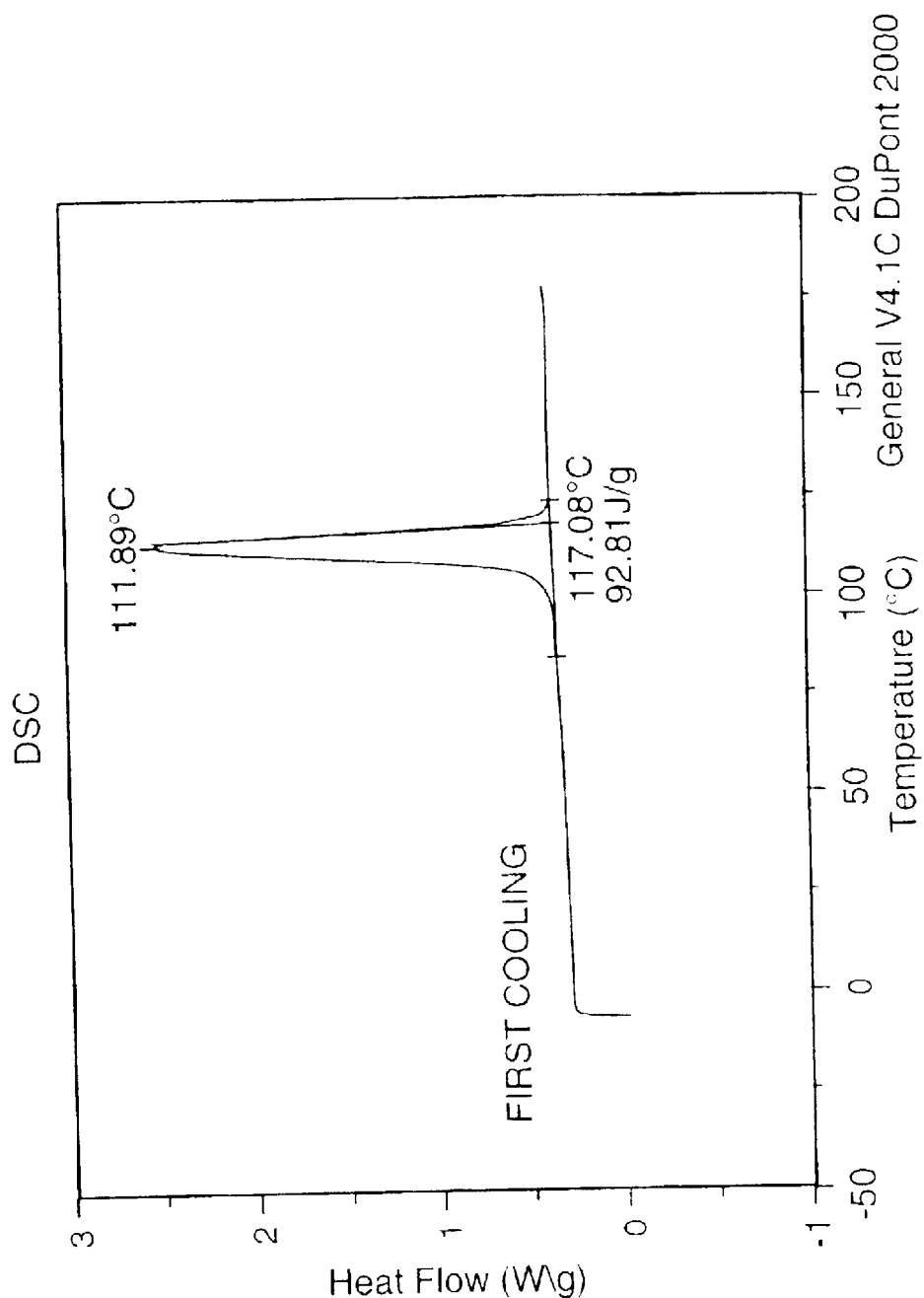
Figure 5:
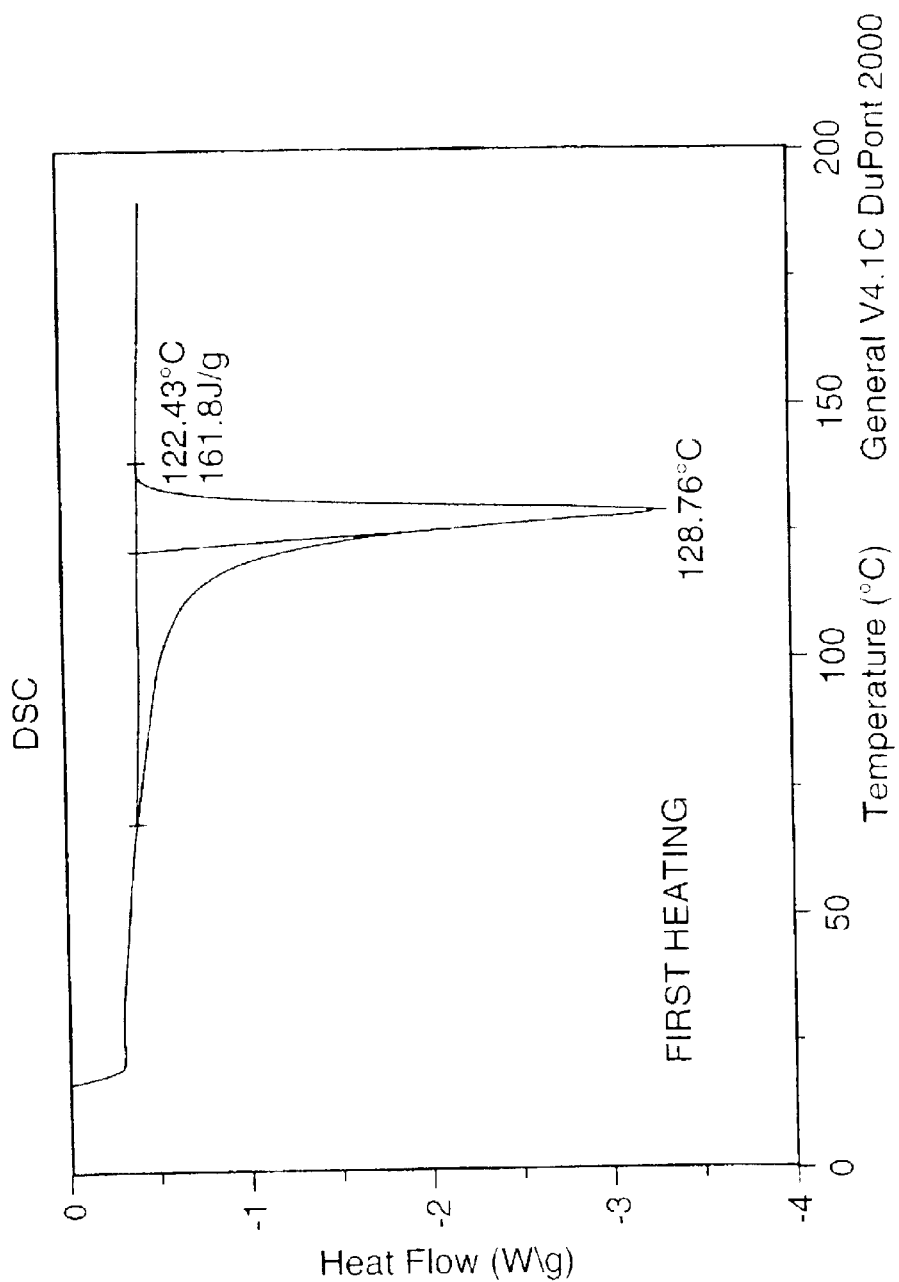
Figure 6:
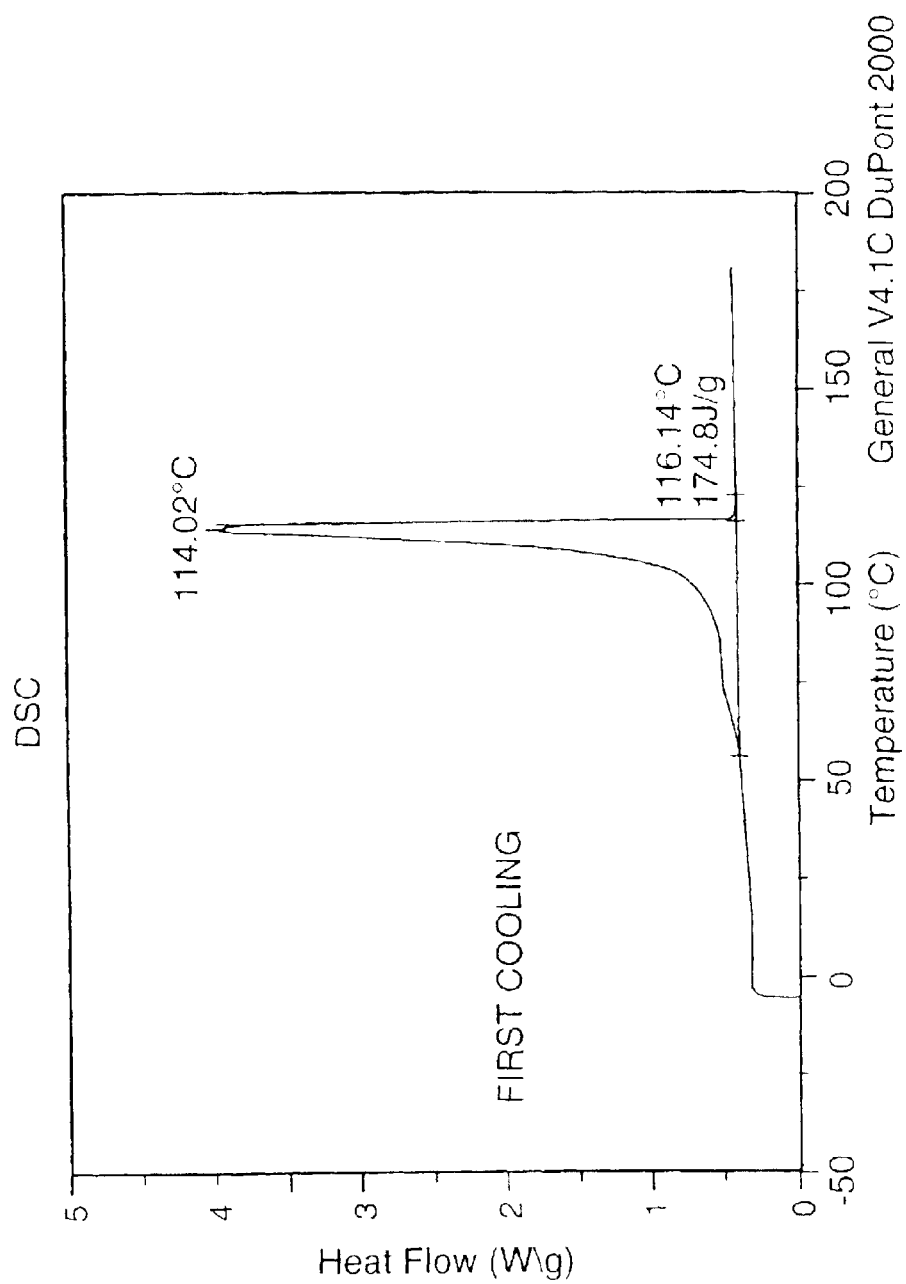

With reference to FIGS. 1 and 2, there is illustrated the DSC for melamine, one of the particulate materials used in these Examples. With reference to FIGS. 3 and 4, there is illustrated the DSC for polypropylene, one of the particulate materials used in these Examples. With reference to FIGS. 5 and 6, there is illustrated the DSC for polyethylene, one of the particulate materials used in these Examples. As can be clearly seen, the DSC for polypropylene and polyethylene result in an enthalpy of endothermic transition of 87 (average) and 168 (average) J/g, respectively. In contrast, the DSC for methylene is negligible.

Figure 7:
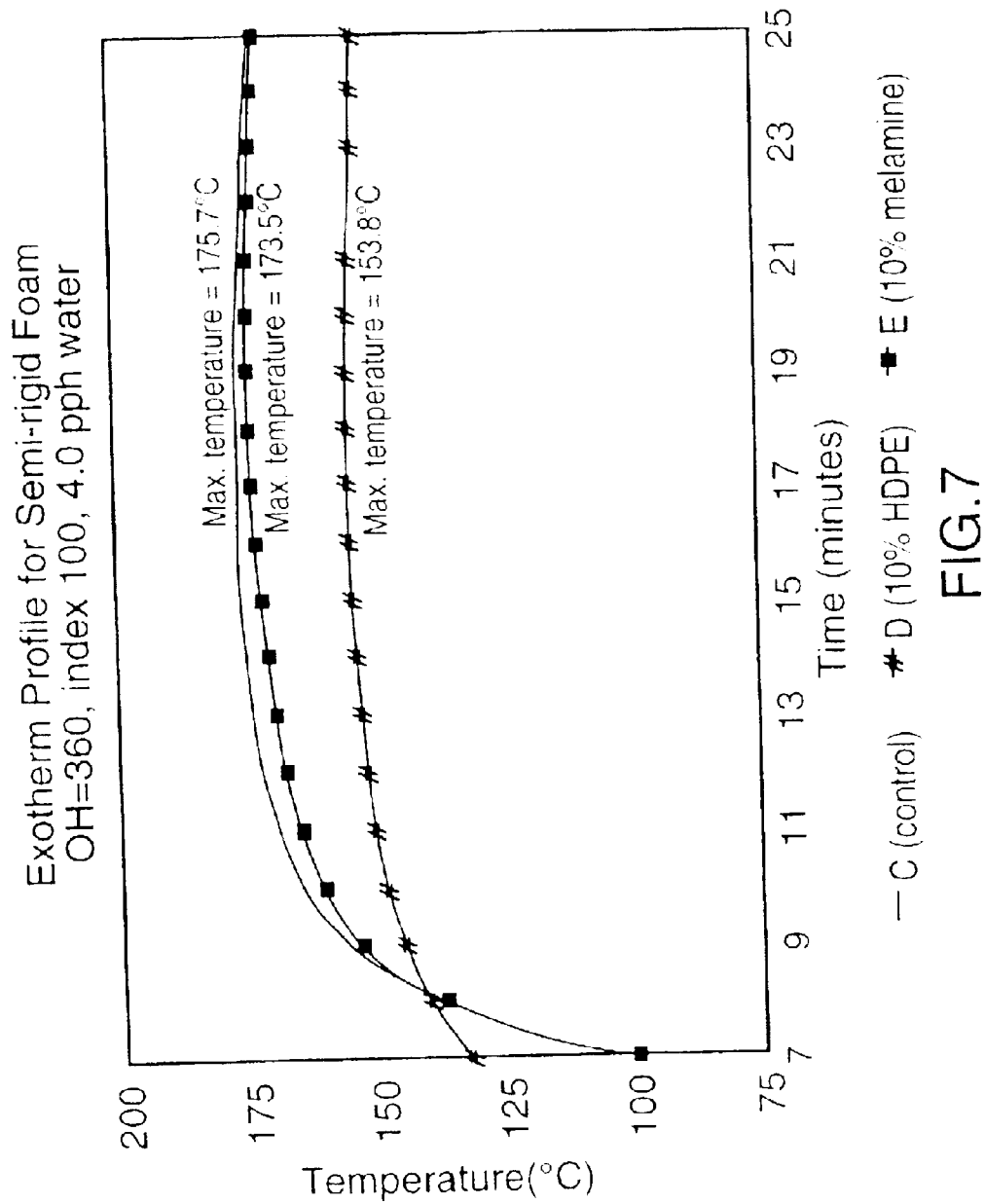
FIGS. 7–9 illustrate the exotherm profiles for various foams made in the Examples set out hereinbelow.

As can be seen with reference to the exotherm reduction reported in respect of Examples 1–3 in Table 1, the use of polyethylene significantly improves exotherm reduction. Specifically, using the same amount of polyethylene as melamine resulted in a 12-fold increase in exotherm reduction. The results of Examples 1–3 are illustrated in FIG. 7.

Figure 8:
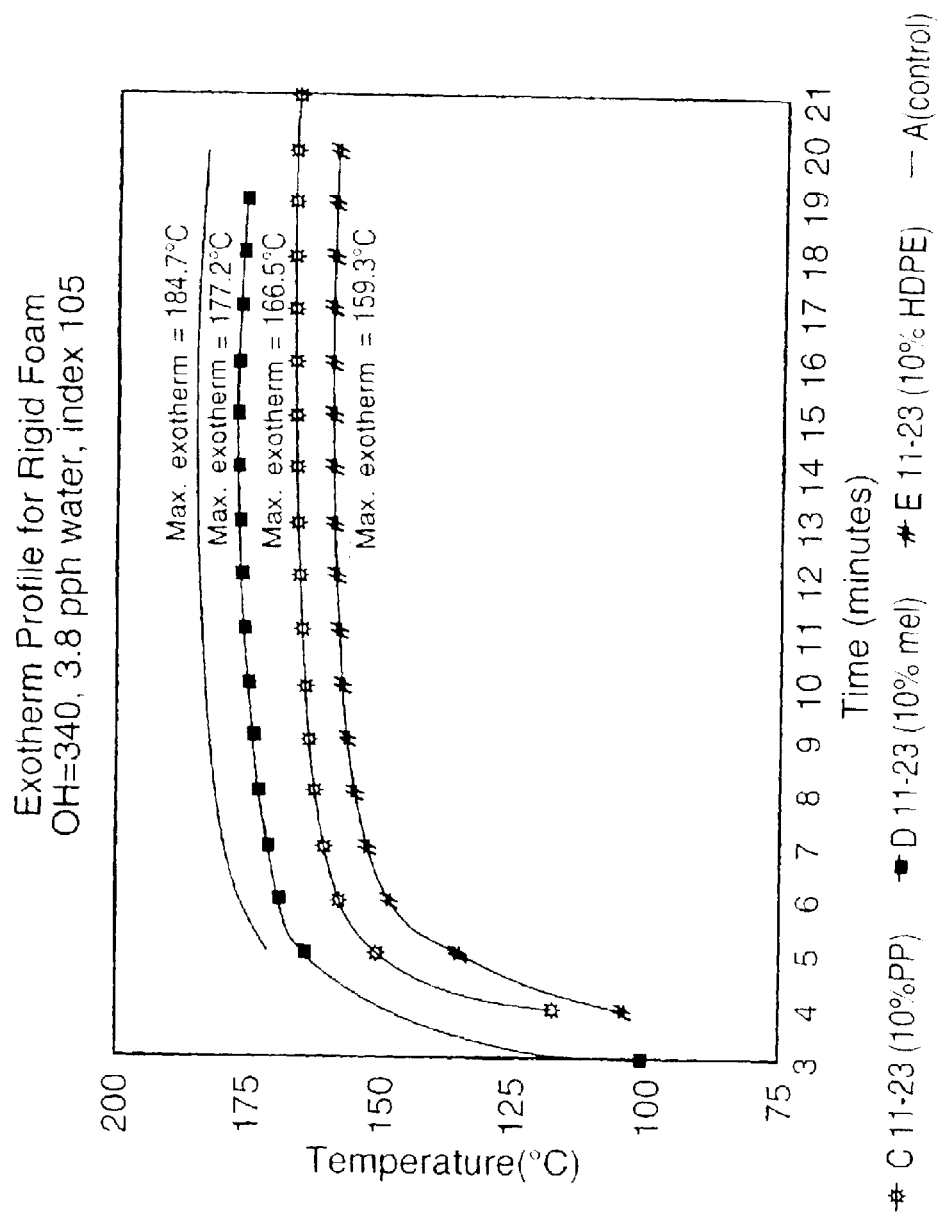

With reference to Examples 4–7, it can be seen that, again, the use of polyethylene and polypropylene results in a significant benefit in terms of exotherm reduction compared to the use of no particulate material or the use of melamine which has a negligible enthalpy of endothermic phase change. The results in Example 4–7 are illustrated in FIG. 8.

With reference to Examples 8–10, these Examples illustrate the beneficial exotherm reduction properties previously seen are also seen in a formulation used to produce a rigid molded foam.

Figure 9:
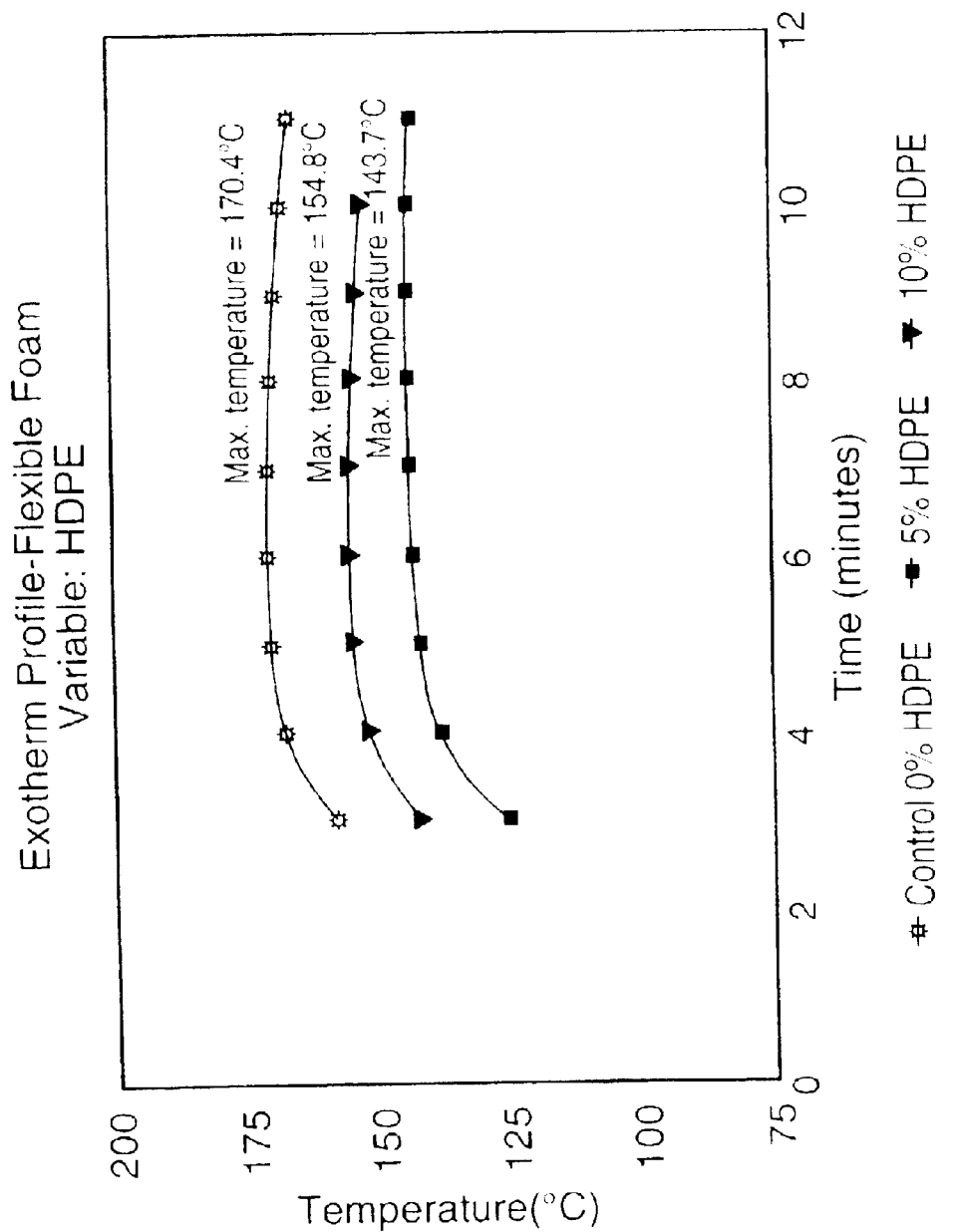

Further, with reference to Examples 11–13, the benefits of exotherm reduction using polyethylene are seen in a flexible slab foam formulation. The results in Examples 10–12 are illustrated in FIG. 9.

Further, with reference to Examples 14 and 15, the benefits of exotherm reduction using polyethylene are seen in a HR mold foam formulation.

While the invention has been described hereinabove with reference to various preferred embodiments and specific Examples, it will be clearly understood by those of skill in the art that modifications to and variations of the preferred embodiments and specific Examples are possible which do not depart from the spirit and scope of the present invention. Accordingly, it is contemplated that such modifications to and variations of the preferred embodiments and specific Examples are encompassed by the invention.

TABLE 1

| | Example | | | | | | |
|---|---|---|---|---|---|---|---|
| | 1 | 2 | 3 | 4 | 5 | 6 | 7 |
| Type of composition | SRS | SRS | SRS | SRS | SRS | SRS | SRS |
| Total OH number | 360 | 360 | 360 | 340 | 340 | 340 | 340 |
| Arcol ™ PPG-725 | — | — | — | 25 | 25 | 25 | 25 |
| Voranol ™ 360 | — | — | — | 75 | 75 | 75 | 75 |
| Baynat ™ 755 | 100 | 100 | 100 | — | — | — | — |
| Water | — | — | — | 3.8 | 3.8 | 3.8 | 3.8 |
| Melamine | 24 | — | — | — | 26 | — | — |
| Polyethylene | — | 6 | 24 | — | — | 26 | — |
| Polypropylene | — | — | — | — | — | — | 26 |
| Tegostab ™ B8871 | — | — | — | 1.0 | 1.0 | 1.0 | 1.0 |
| Niax ™ A-1 | — | — | — | 0.13 | 0.13 | 0.13 | 0.13 |
| Dabco ™ T-12 | — | — | — | 0.02 | 0.02 | 0.02 | 0.02 |
| Isocyanate A | — | — | — | 145 | 145 | 145 | 145 |
| Isocyanate B | 140 | 140 | 140 | — | — | — | — |
| Exotherm reduction, T, ° C. | 2 | 6 | 24 | Control | 8 | 25 | 18 |

SRS = Semi-rigid slab foam

| | Example | | | | | |
|---|---|---|---|---|---|---|
| | 8 | 9 | 10 | 11 | 12 | 13 |
| Type of composition | RM | RM | RM | FS | FS | FS |
| Total OH number | 380 | 380 | 380 | 56 | 56 | 56 |

TABLE 1-continued

| | | | | | | |
|---|---|---|---|---|---|---|
| Voranol ™ 230–660 | 35 | 35 | 35 | — | — | — |
| PS 2502A | 35 | 35 | 35 | — | — | — |
| Pluracol ™ P-1178 | 30 | 30 | 30 | — | — | — |
| Arcol ™ F3020 | — | — | — | 100 | 100 | 100 |
| DEG | 5 | 5 | 5 | — | — | — |
| Water | 3.4 | 3.4 | 3.4 | 6.0 | 6.0 | 6.0 |
| Melamine | — | 26 | — | — | — | — |
| Polyethylene | — | — | 26 | — | 9.0 | 18.5 |
| Goldschmidt ™ B4690 | 0.5 | 0.5 | 0.5 | — | — | — |
| Niax ™ C-255 | — | — | — | 0.3 | 0.3 | 0.3 |
| Polycat ™ 12 | 1.0 | 1.0 | 1.0 | — | — | — |
| Dabco ™ T-10 | — | — | — | 0.2 | 0.2 | 0.2 |
| Isocyanate A | 140 | 140 | 140 | — | — | — |
| Isocyanate C | — | — | — | 76 | 76 | 76 |
| Exotherm reduction, T, ° C. | Control | 1 | 19 | Control | 16 | 27 |

RM = Rigid molded
FS = Flexible Slab

| | Example | |
|---|---|---|
| | 14 | 15 |
| Type of composition | HR | HR |
| Total OH number | 49 | 49 |
| Voranol ™ 4701 | 54.7 | 55.4 |
| Arcol ™ 788 | 45.3 | 33.9 |
| DEOLF | 1.7 | 1.7 |
| Water | 4.0 | 4.0 |
| UAX-Y10184 | 1.2 | 1.2 |
| Polyethylene | — | 10.7 |
| Niax ™ A-1 | 0.08 | 0.08 |
| Dabco ™ 33LV | 0.32 | 0.32 |
| Isocyanate C | 49.6 | 49.2 |
| Exotherm reduction, T, ° C. | Control | 8 |

HR = High Resiliency Molded

What is claimed is:

1. An isocyanate-based polymer foam comprising an isocyanate-based polymer foam matrix having disposed therein a crystalline solid particulate organic polymer material having an enthalpy of endothermic phase transition in the range of from about 100 to about 600 J/g.

2. The isocyanate-based polymer defined in claim 1, wherein the particulate material has an enthalpy of endothermic phase transition in the range of about 100 to about 600 J/g.

3. The isocyanate-based polymer defined in claim 1, wherein the particulate material has an enthalpy of endothermic phase transition of from about 100 to about 250 J/g.

4. The isocyanate-based polymer defined in claim 1, wherein the particulate material is a solid at ambient temperature and pressure.

5. The isocyanate-based polymer defined in claim 1, wherein the particulate material has an average particle size of less than about 1000 μm.

6. The isocyanate-based polymer defined in claim 1, wherein the particulate material has an average particle size in the range of from about 10 to about 200 μm.

7. The isocyanate-based polymer defined in claim 1, wherein the particulate material is present in an amount of less than about 20% by weight of the foam.

8. The isocyanate-based polymer defined in claim 1, wherein the particulate material is present in an amount of from about 5% to about 10% by weight of the foam.

9. The isocyanate-based polymer foam defined in claim 8, wherein the organic polymer thermoplastic material.

10. The isocyanate-based polymer foam defined in claim 1, wherein the particulate material comprises polyethylene.

11. The isocyanate-based polymer foam defined in claim 1, wherein the particulate material comprises HDPE.

12. A process for producing an isocyanate-based polymer foam, the process comprising the steps of:
   contacting an isocyanate, an active-hydrogen containing compound, water, a catalyst and a crystalline solid particulate organic polymer material having an enthalpy of endothermic phase transition in the range of from about 100 to about 600 J/g to produce a reaction mixture;
   expanding the reaction mixture to produce the isocyanate-based polymer foam.

13. The process defined in claim 12, wherein the amount water is used in an amount in the range of from about 0.20 to about 8.0 parts by weight per one hundred parts by weight of the active hydrogen-containing compound.

14. The process defined in claim 12, wherein the amount water is used in an amount in the range of from about 3.0 to about 8.0 parts by weight per one hundred parts by weight of the active hydrogen-containing compound.

15. The process defined in claim 12, wherein the isocyanate is selected from the group comprising 1,6-hexamethylene diisocyanate, 1,4-butylene diisocyanate, furfurylidene diisocyanate, 2,4-toluene diisocyanate, 2,6-toluene diisocyanate, 2,4'-diphenylmethane diisocyanate, 4,4'-diphenylmethane diisocyanate, 4,4'-diphenylpropane diisocyanate, 4,4'-diphenyl-3 ,3'-dimethyl methane diisocyanate, 1,5-naphthalene diisocyanate, 1-methyl-2,4-diisocyanate-5-chlorobenzene, 2,4-diisocyanato-s-triazine, 1-methyl-2,4-diisocyanato cyclohexane, p-phenylene diisocyanate, m-phenylene diisocyanate, 1,4-naphthalene diisocyanate, dianisidine diisocyanate, bitoluene diisocyanate, 1,4-xylylene diisocyanate, 1,3-xylylene diisocyanate, bis-(4-isocyanatophenyl)methane, bis-(3-methyl-4-isocyanatophenyl)methane, polymethylene polyphenyl polyisocyanates and mixtures thereof.

16. The process defined in claim 12, wherein the isocyanate is selected from the group consisting essentially of 2,4'-diphenylmethane diisocyanate, 4,4'-diphenylmethane diisocyanate and mixtures thereof.

17. The process defined in claim 12, wherein the isocyanate is selected from the group consisting essentially of 2,4-toluene diisocyanate, 2,6-toluene diisocyanate and mixtures thereof.

18. The process defined in claim 12, wherein the isocyanate is used in an amount to provide an isocyanate index in the range of from about 60 to about 200.

19. The process defined in claim 12, wherein the isocyanate is used in an amount to provide an isocyanate index in the range of from about 90 to about 120.

20. The process defined in claim 12, wherein the active hydrogen-containing compound is selected from the group comprising polyols, polyamines, polyamides, polyimines, polyolamines and mixtures thereof.

21. The process defined in claim 12, wherein the polyol is a hydroxyl-terminated backbone of a member selected from the group comprising polyether, polyesters, polycarbonate, polydiene, polycaprolactone and mixture thereof.

22. The process defined in claim 12, wherein the polyol is a polyether polyol.

23. The process defined in claim 22, wherein the polyether polyol has a molecular weight in the range of from about 200 to about 20,000.

24. A process for producing an isocyanate-based polymer foam, the process comprising the steps of:
   contacting an isocyanate, an active-hydrogen containing compound, water, a catalyst and a crystalline solid particulate organic polymer material to produce a reaction mixture, wherein said crystalline solid particulate organic polymer material has an enthalpy of endothermic phase transition in the range of from about 100 to about 600 J/g;

expanding the reaction mixture to produce the isocyanate-based polymer foam;

wherein the particulate material is selected such that the temperature of the reaction mixture during expansion is lower than the temperature of a reaction omitting the particulate material.

25. An isocyanate-based polymer foam comprising:

an isocyanate-based polymer foam matrix having disposed therein a crystalline solid particulate polyethylene having an enthalpy of endothermic phase transition in the range of from about 100 to about 600 J/g.

26. An isocyanate-based polymer foam comprising: an isocyanate-based polymer foam matrix having disposed therein a crystalline solid particulate organic polymer material having an enthalpy of endothermic phase transition in the range of from about 100 to about 600 J/g, the particulate material having gone through at least a phase change cycle between a crystalline state and a non-crystalline state.

27. A process for producing an isocyanate-based polymer foam, the process comprising the steps of:

contacting an isocyanate, an active-hydrogen containing compound, water, a catalyst, and a crystalline solid particulate organic polymer material to produce a reaction mixture, wherein said crystalline solid particulate organic polymer material has an enthalpy of endothermic phase transition in the range of from about 100 to about 600 J/g;

reacting the isocyanate, the active-hydrogen containing compound, water, and the catalyst to produce an exotherm;

absorbing at least a portion of heat from the exotherm by the crystalline particulate material;

phase-changing the crystalline particulate organic polymer material to a non-crystalline material; and expanding the reaction mixture to produce the isocyanate-based polymer foam.

* * * * *